AUTOMATIC FREQUENCY CONTROL IN PULSE MODULATION SYSTEMS

Filed Jan. 12, 1954

INVENTORS
ARNOLD M. LEVINE
ROBERT S. BAILEY
BY Percy P. Lantzy
ATTORNEY

United States Patent Office 2,889,521

Patented June 2, 1959

2,889,521

AUTOMATIC FREQUENCY CONTROL IN PULSE MODULATION SYSTEMS

Arnold M. Levine, River Edge, and Robert S. Bailey, Waldwick, N.J., assignors to International Telephone and Telegraph Corporation, Nutley, N.J., a corporation of Maryland Application January 12, 1954, Serial No. 403,599

8 Claims. (Cl. 332—9)

Figure 1:
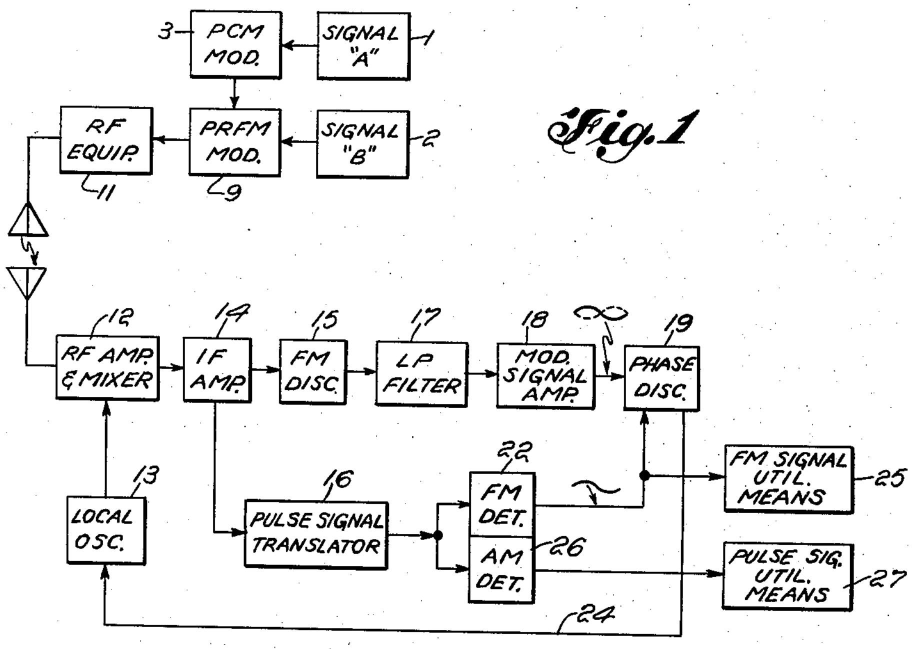

This invention relates to communication systems of the pulse modulation type and more particularly to an automatic frequency control employed in the receiving equipment thereof.

Pulse modulation systems have found wide prominence in the communication field for conveying intelligence from one point to a distant point through various media. It is well known that in pulse modulation systems a given characteristic of a pulse signal is varied in accordance with an intelligence signal at the transmitting end of a communication system with the characteristic variation being translated at the receiver end for recovery of the intelligence signal. Examples of the pulse modulation systems presently being employed for communication are the pulse time modulation (PTM), pulse amplitude modulation (PAM), pulse width modulation (PWM) and pulse code modulation (PCM). The first of these systems rely upon the position or time displacement of a pulse to convey the intelligence signal from one point to another. The second and third of these systems rely upon varying amplitude and varying duration of the pulse, respectively, to convey the desired intelligence signal. The latter of these pulse modulation systems rely upon the presence or absence of pulses disposed in a pulse code group according to a predetermined code arrangement, such as the binary code system or reflected binary code system, sometimes referred to as a cyclic progression code, to convey the desired intelligence. Each one of these systems samples the modulating or intelligence signal at a predetermined rate. Thus, each one of the resulting pulses, or combination of pulses, is indicative of the amplitude of the modulating signal at the time of sampling and when combined to form a pulse train are recurrent at the sampling or repetition frequency, said frequency being consistent with the system requirement and good engineering practices for a given communication system to convey an intelligence signal by transmitting pieces of information about said signal for acceptable reproduction.

Having set forth hereinabove means for conveying intelligence from one point to another by varying certain characteristics of a pulse signal, it has been recognized that additional information, such as a reference signal for positioning an object relative to the main signal received by said object, may be accomplished by frequency modulating the repetitious or sampling frequency of the pulse modulation signal. Let us assume that a PCM system is employed wherein an intelligence signal is conveyed from one point to another by means of a binary code and that the repetitious rate existent between the code groups is varied in accordance with a constant frequency and amplitude auxiliary signal. In this way, it is possible to send two pieces of information, the main intelligence signal as conveyed by sending a pulse coded signal and the auxiliary intelligence signal by varying the repetitive frequency of the pulse code groups by means of frequency modulation.

As in all communications systems, it is desirable to frequency control the receiver thereof. Such a frequency control, while it may be accomplished manually, is preferably accomplished by an automatic means particularly for unattended receivers. In those systems employing pulse repetition frequency modulation in addition to the normal pulse modulation, it has been found advantageous to employ the pulse repetition frequency for activation of an automatic frequency control system to achieve the desired frequency control of a receiving means.

Therefore, it is an object of this invention to provide an automatic frequency control system for a pulse modulation communication system wherein the superimposed pulse repetition frequency modulation is employed to activate the frequency control system.

A feature of this invention is the provision of a first detector to detect the pulse repetition frequency component of signal pulses and a phase comparison means coupled thereto. There is also provided a translation means to translate the signal pulses into energy representative of the pulse modulated signal component carrying therewith the frequency modulated repetition rate signal component and a second detector means coupled to the output of said translator to remove from the translated output therefrom the pulse repetitious frequency modulation component for application to the phase comparison means for production of a correction signal for coupling to the local oscillator of the receiver circuit to stabilize the center frequency received thereby consistent with the phase difference existing betwen the output signals of the first and second detection means.

Another feature of this invention includes as the means for detecting the frequency modulated pulse repetition frequency a frequency modulation discriminator and a low-pass filter coupled thereto for selecting a modulating signal represented by the variation in the pulse repetition frequency for application to a phase discriminator for comparison with the frequency modulation component of a translated signal derived from the pulse signal applied to a translating means normally associated with a pulse modulation communication system. The comparison of the two frequency modulation signal components derived directly from the pulse signal and from the translated or converted pulse signal produces a correction voltage of proper magnitude and polarity to correct the center frequency of the pulse signal received by the receiving equipment through operation upon the frequency generated by the local oscillator therein.

Figure 2:
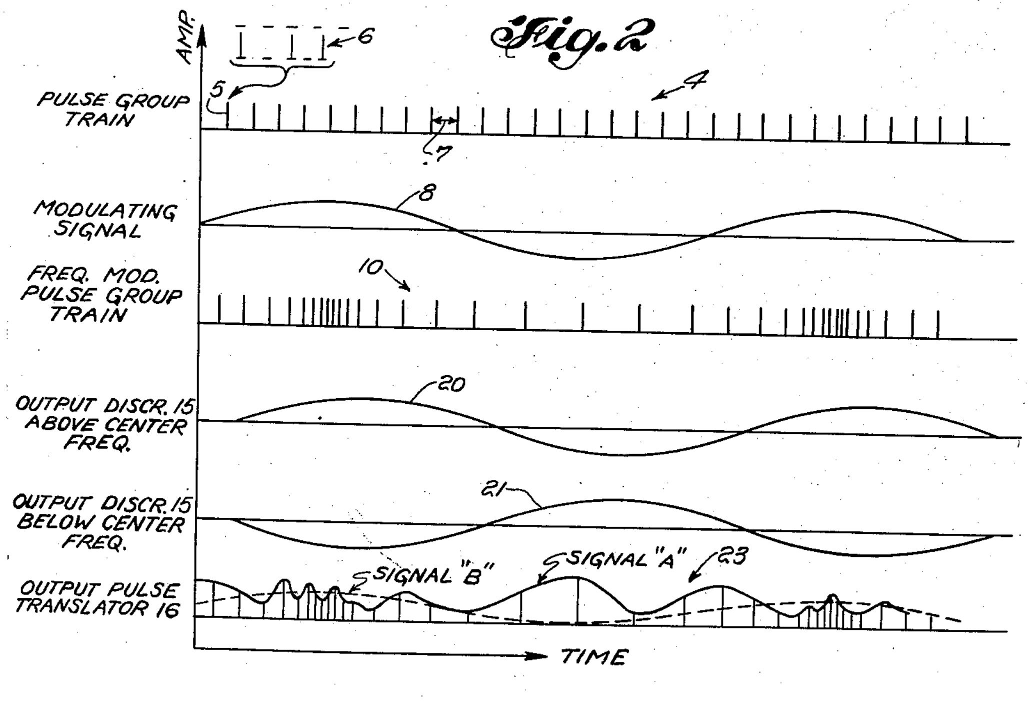

The above-mentioned and other features and objects of this invention will become more apparent by reference to the following description taken in conjunction with the accompanying drawings, in which:

Fig. 1 is a block diagram of a pulse modulation communication system employing at the receiving end thereof an automatic frequency control system in accordance with the principles of this invention, and Fig. 2 illustrates a series of signal curves useful in explaining the operation of the circuit of Fig. 1.

Referring to Fig. 1, there is illustrated therein a pulse code modulation type communication system employed herein as an example for purpose of describing the operation of the automatic frequency control system of this invention. At the transmitting end of the communication system a pair of modulating signal sources 1 and 2 are provided. The signal of source 1 is sampled at a given repetition or sampling rate in a conventional manner by known PCM modulating circuitry as indicated by PCM modulator 3, including the normal synchronizing signal source, to provide a pulse code modulation type of pulse signal having as a component thereof the normally present synchronizing signal. Curve 4 of Fig. 2 illustrates a thusly derived train of pulse code groups wherein each code group is represented by a single mark as indicated at 5. Mark 5 when expanded to a larger scale illustrates a given number of code pulse positions or bauds as shown at 6 wherein the signal amplitude or level at the time of sampling the signal of source 1 is represented by a predetermined sequence of presence or absence of pulses within a pulse code group. There is illustrated at 6 a binary pulse code group having five code digits or bauds wherein the coded arrangement of the on-off pulses therein represents a given segment of a modulation signal which attained one of the possible 32 signal levels capable of being coded utilizing this common type of PCM code arrangement. Each of the pulse code groups representative of the modulating signal amplitude within the limits of the code arrangement utilized has a certain repetitive rate as indicated at 7 in curve 4 of Fig. 2 by the spacing between the pulse code group marks.

The signal of source 2 as represented by curve 8 of Fig. 2 having for example a constant amplitude and a constant frequency of 30 c.p.s. is utilized to modulate the repetition rate of the pulse code groups produced in modulator 3 by employment of conventional frequency modulation circuitry in a manner to vary the spacing between adjacent code groups. The resultant output from modulator 9 as represented by curve 10 of Fig. 2 comprises two superimposed pieces of information, one piece of information being contained in the various code groups and the second piece of information being carried by the frequency modulated repetition frequency of the pulse code group train.

This resultant signal is coupled to radio frequency equipment 11 wherein the carrier frequency signal is modulated in accordance with the doubly modulated signal from modulator 9 and transmitted by means of radio or other transmission media to receiving radio frequency equipment 12. Radio frequency equipment 12 includes a means to amplify the received radio frequency energy and means, including local oscillator 13, to perform, in a heterodyning manner, a reduction of the radio frequency signal to a desired intermediate frequency. This intermediate frequency signal is amplied by IF amplifier 14 prior to application to the detecting portion of the system receiver and the associated automatic frequency control system consistent with the requirements of this invention.

The output of the intermediate frequency amplifier constitutes a source of pulse signals having the repetitive rate of the pulse code groups frequency modulated with signal B of source 2 and a pulse code modulation signal as dictated by the signal levels of the modulating signal A of source 1. This pulse signal is coupled to frequency modulation discriminator or detector 15 configured in a conventional manner to perform the detection of the frequency modulation pulse signal component. At the same time the pulse signal is coupled to signal pulse translator or converter 16 for extracting from the pulse code group signal component the intelligence imparted thereto by the modulating signal A of source 1. The action of discriminator 15 is to detect in a known manner the frequency modulation component of the pulse signal represented by the varying spacing between the pulse code groups as dictated by signal B. The output of discriminator 15 is passed through a low-pass filter 17 having a cut-off frequency consistent with the removal therefrom of energy truly representative of the signal B of source 2. For the example given, filter 17 would preferably have a cut-off frequency of between 40 and 50 c.p.s. for a modulating signal of 30 c.p.s utilized as a communication system reference signal. After removing energy representative of signal B by action of filter 17, the signal is further amplified by amplifier 18 and applied therefrom to phase discriminator 19.

As is known the action of a frequency modulation detector, such as discriminator 15, is to obtain from a frequency modulated signal, similar to that shown in curve 10 of Fig. 2, output energy representative of the modulating signal. Discriminator 15 is constructed such that its output characteristic is centered about a desired intermediate frequency. It is a well-known fact that if the center frequency of the signal coupled to the input thereof is either above or below the discriminator output center frequency, the resulting output signal will be in phase error with respect to the original modulating signal. Both of the output possibilities of discriminator 15, above and below discriminator center frequency, are illustrated in curves 20 and 21 of Fig. 2, respectively. It will be recognized that both of these curves are not in phase with the original modulating signal B as illustrated in curve 8. When either of these conditions occur, or those conditions in between these extreme conditions, it is desirable to provide a means, preferably automatic, to correct the output center frequency of the signal pulse source, represented therein by the output of IF amplifier 14. To accomplish this correcting action, the filtered and amplified output of discriminator 15 is applied to phase discriminator 19 and compared in phase with a reference modulation signal to derive a correcting voltage whose polarity and magnitude is consistent with the phase relation between these two signals.

The reference modulation signal for comparison purposes in the phase discriminator 19 is derived from the combination of translator 16 and frequency modulation detector or discriminator 22. This is achieved by coupling the pulse signal from amplifier 14 to the pulse code group translator 16 which employs conventional pulse code demodulator circuitry to derive from the various pulse code groups an amplitude modulated signal representative of the signal A and having superimposed thereon signal B. As is known, the action of a pulse code signal translator is timed by a synchronizing pulse which when once started continues in a predetermined manner. The functioning of translator 16 normally is not affected by phase changes or shifts resulting from the transmission path from transmitter to receiver or a shift in the intermediate frequency. The translated output of the pulse signal translator 16 not only indicates the amplitude variations of signal A at a given sampling time but further includes therein the frequency modulation component having a substantially identical phase relation with respect to the signal B, as indicated in curve 23 of Fig. 2. The translated output of translator 16 is coupled to a second frequency modulation detector or discriminator 22 to derive therefrom the frequency modulation component superimposed upon the translated pulse code group train. The detected frequency modulation component represents the desired reference signal for comparison in discriminator 19 with the filtered and amplified output of detector 15 for achieving the automatic frequency control action of this invention. The phase discriminator 19 develops at the output thereof a correction voltage consistent with the phase difference existing between the output signal of the IF–FM discriminator 15 and the reference signal derived from the translated frequency modulated pulse code group signal. This correction voltage is coupled along conductor 24 to the local oscillator 13 to correct the output of the local oscillator to provide a controlling of the resultant intermediate frequency and thereby provides the desired function of automatic frequency control for the signal received by the receiving equipment of this communication system.

The signal derived from the signal pulse translator 16 and detector 22 further is coupled to a frequency modulation signal utilization means 25 which may be utilized in a manner consistent with the proper superimposing of signal B upon the pulse code signal, such for example as a reference point locating means for a system employing the type of communication system herein described. The translated output of signal translator 16 is coupled also to an AM detector 26 which detects the amplitude variation of the translated pulse code groups and coupled the resultant output therefrom to a pulse signaling utilization means 27 which may function for example to control in a supervisory manner the action of a guided object, or the distribution and control of power on a public utility distribution communication system.

Referring to curve 23 of Fig. 2, it is obvious that the frequency modulation of the pulse group repetitive frequency tends to present a distorted reproduction of signal A. This occurs due to the variation of spacing between the pulse code groups. However, knowing that the frequency and amplitude of signal B is a constant value when employed in the manner proposed, it has been possible to remove the resulting constant distortion from the resulting output of AM detector 26 by the proper design of the circuit components of detector 26. This is accomplished by inserting in detector 26 a means having a reverse distortion characteristic to cancel or substantially eliminate the distortion introduced by frequency modulating the repetitive frequency of the pulse code groups according to signal B. Thus, the obvious distortion introduced to facilitate superimposing a second modulation signal upon a train of pulse code groups for the purpose of transmitting auxiliary information and simple automatic frequency control system may be easily compensated for by proper design of detector 26.

While the description of our automatic frequency control system has been directed towards those communication systems transmitting a pulse code modulation type signal, it is applicable as well to communication systems transmitting other known types of pulse modulation having a given repetitive frequency associated with the resultant pulse signal. The frequency control system herein described will function in a substantially identical manner when employed with PTM, PAM or PWM systems provided necessary care is taken to distinguish between pulse displacement due to the pulse modulating signal and that signal employed to frequency modulate the repetitive frequency normally present in any of the above pulse modulation systems. This may be accomplished by good engineering design and practice relative to the circuits associated with discriminators 15, 22 and 26 and the pulse signal translator 16 by following the thoughts and pattern hereinabove set forth.

While we have described above the principles of our invention in connection with specific apparatus, it is to be clearly understood that this description is made only by way of example and not as a limitation to the scope of our invention as set forth in the objects thereof and in the accompanying claims.

We claim:

1. An automatic frequency control system for a pulse modulation communication system having a source of signal pulses wherein the repetitive rate of the pulses is frequency modulated with a first signal and another characteristic of the pulses is modulated with a second signal, comprising a first detection means coupled to said source to detect the first signal component of said signal pulses, translation means coupled to said source to translate said signal pulses into energy representative of the second signal component of said signal pulses carrying therewith the first signal component of said signal pulses, a second detection means coupled to said translation means to detect the first signal component of the translated output therefrom, phase comparison means coupled to said first and second detection means for production of a correction signal consistent with the phase difference existing between the output signals of said first and second detection means, and means coupling said correction signal to said source to control the center frequency of the pulse signals emitted from said source.

2. A system according to claim 1, wherein said first detection means includes a frequency modulation discriminator coupled to said source to detect the frequency modulation component of said signal pulses and a low-pass filter coupled to the output of said discriminator to extract from the detected frequency modulation component only that energy representative of said first signal.

3. A system according to claim 1, wherein said first detection means includes a frequency modulation discriminator coupled to said source to detect the frequency modulation component of said signal pulses, a low-pass filter coupled to the output of said discriminator to extract from the detected frequency modulation component only that energy representative of said first signal and an amplifier coupled to said filter for amplifying the output thereof prior to conduction to said phase comparison means.

4. A system according to claim 1, wherein said signal pulses are of the pulse code modulation type and said translation means includes a pulse code modulation decoder.

5. A system according to claim 1, wherein said second detection means includes a frequency modulation discriminator.

6. An automatic frequency control system for a pulse modulation communication system having a source of signal pulses wherein the repetitive rate of the signal pulses is frequency modulated with a first signal and another characteristic of the signal pulses is modulated with a second signal, comprising a detection means coupled to said source to detect the first signal component of said signal pulses, means coupled to said source to provide a reference signal having phase coincidence with said first signal, phase comparison means coupled to said detection means and said reference signal providing means for production of a correction signal, and means coupling said correction signal to said source to control the center frequency of the pulse signals emitted from said source.

7. An automatic frequency control system for a pulse modulation communication system having a source of signal pulses wherein the repetitive rate of the pulses is frequency modulated with a constant frequency signal and another characteristic of the pulses is modulated with a second signal, comprising a first frequency modulation detector coupled to said source to detect the frequency modulation component of said signal pulses including therein said constant frequency signal, a low-pass filter coupled to said first detector to select said constant frequency signal from the frequency modulation component of said signal pulses, translation means coupled to said source to translate said signal pulses into energy representative of the second signal component of said signal pulses carrying therewith the constant frequency signal component of said signal pulses, a second frequency modulation detector coupled to said translation means to detect the constant frequency signal component of the translated output therefrom, phase comparison means coupled to said filter and said second frequency modulation detector for production of a correction signal consistent with the phase difference existing between the output signals of said first and second detectors, and means coupling said correction signal to said source to control the center frequency of the pulse signals emitted from said source.

8. An automatic frequency control system for a pulse code modulation communication system having a source of signal pulse code groups wherein the repetitive rate of the code groups is frequency modulated with a constant frequency signal and the pulse condition within the pulse code groups is representative of a second signal, comprising a detection means including a first frequency modulation detector coupled to said source to detect the constant frequency signal component of said code groups, decoding means coupled to said source to translate said code group into amplitude modulated energy representative of the second signal component of said code groups carrying therewith the constant frequency signal component of said code groups, a second frequency modulation detector coupled to said decoding means to detect the constant frequency signal component of the amplitude modulated energy output therefrom, a phase discriminator coupled to both of said detectors for production of a correction signal consistent with the phase difference existing between the output signals of said first and second frequency modulation detectors, and means coupling said correction signal to said source to control the center frequency of the signal pulse code groups emitted from said source.

References Cited in the file of this patent

UNITED STATES PATENTS

| | | |
|---|---|---|
| 2,468,038 | Clavier | Apr. 26, 1949 |
| 2,492,134 | Cole | Dec. 27, 1949 |